US012738976B2

(12) United States Patent
Kliger et al.

(10) Patent No.: US 12,738,976 B2
(45) Date of Patent: Sep. 15, 2026

(54) SMART AMPLIFIER DIAGNOSTIC SYSTEMS AND METHODS

(71) Applicant: Avago Technologies International Sales Pte. Limited, Singapore (SG)

(72) Inventors: Avraham Kliger, Ramat Gan (IL); Hagay Garti, Be'er Ya'acov (IL); Yitshak David Ohana, Giv'at Ze'ev (IL)

(73) Assignee: Avago Technologies International Sales Pte. Limited, Singapore (SG)

( * ) Notice: Subject to any disclaimer, the term of this patent is extended or adjusted under 35 U.S.C. 154(b) by 378 days.

(21) Appl. No.: 18/495,470

(22) Filed: Oct. 26, 2023

(65) Prior Publication Data

US 2024/0162934 A1 May 16, 2024

Related U.S. Application Data

(60) Provisional application No. 63/425,649, filed on Nov. 15, 2022.

(51) Int. Cl.
*H04B 3/493* (2015.01)
*H04B 3/23* (2006.01)

(52) U.S. Cl.
CPC ............... *H04B 3/493* (2015.01); *H04B 3/23* (2013.01)

(58) Field of Classification Search
CPC . H04B 3/493; H04B 3/23; H04B 3/46; H04B 3/04
See application file for complete search history.

(56) References Cited

U.S. PATENT DOCUMENTS

2005/0180559 A1* 8/2005 Pisoni ............... H04L 25/03159 379/406.01
2018/0158588 A1 6/2018 Manipatruni et al.
2018/0219577 A1* 8/2018 Zhang ...................... H04B 3/20
2020/0313705 A1 10/2020 Jin

OTHER PUBLICATIONS

DVB Organization Home_networks.pdf:, DVB Digital Vidwo Broadcasting C/O EBU 17A Ancienne Route, CH-1218 Grand Saconnex, Geneva—Switzerland Dec. 9, 2010.
European Search Report on EP Appln. No. 23209457.3 dated Apr. 4, 2024.
PNM Best Practices Primer: Data Over Cable Service Interface Specification Proactive Network Maintenance Primer for PNM Best Practices in HFC Networks (DOCSIS 3.1) C-MGL-PNM-3.1 vo3-220118 released:. Jan. 18, 2022 pp. 1-191; retrieved from the internet URL:https://account.cablelabs.com/server/a;fresco/43fdlc83-6753-4466-84ed-c758ca3d19a6.

* cited by examiner

*Primary Examiner* — Jung H Park
(74) *Attorney, Agent, or Firm* — Foley & Lardner LLP

(57) ABSTRACT

An amplifier for a cable network includes circuitry configured to provide a diagnostic parameter. Exemplary parameter include one or more of: measurements of a frequency response, suckouts in the frequency domain, north upstream echo signal or power, north downstream signal or power, north upstream echo to downstream power ratio, north upstream echo to residual echo power ratio, downstream echo canceller coefficients, south downstream signal or power, upstream information, south downstream echo signal or power, south upstream signal or power, south downstream echo to upstream power ratio, south downstream echo to residual echo power ratio, upstream echo canceller coefficients, and north upstream signal or power.

19 Claims, 6 Drawing Sheets

SMART AMPLIFIER DIAGNOSTIC SYSTEMS AND METHODS

CROSS REFERENCE TO RELATED APPLICATIONS

The present application claims the benefit of and priority to U.S. Application Ser. No. 63/425,649, filed Nov. 15, 2022 which is incorporated by reference in its entirety.

FIELD OF THE DISCLOSURE

This disclosure generally relates to systems and methods for communication. In particular, this disclosure relates to systems and methods for performing diagnostics and/or obtaining information for diagnostics in a communication system.

BACKGROUND OF THE DISCLOSURE

Proliferation of communication technology enables multiple devices to communicate with each other via a network. For example, in cable modem deployments, a number of client devices may communicate with a host device, at least partly over a communication medium (e.g., a physical connection). In one configuration, a node operated by a network service provider is coupled via one or more physical interfaces to a number of taps (e.g., eighty taps), where each tap is connected to a number of network devices such as routers, switches or modems operated by users.

Communication may occur over the communication medium (e.g., a single or multiple wires such as a cable) to deliver content. For example, a group of taps may be coupled to a common wired communication link of the medium referred to as a leg. Each tap or a network device coupled to a leg communicates through a statically or dynamically assigned subcarrier within a frequency response of the leg.

A node may combine signals from different legs to accommodate a communication through a larger number of network devices. For example, a node may be coupled to four legs in parallel, where each leg is coupled to a group of taps. Amplifiers or repeaters can be deployed at various points on the medium. Diagnosing faults on the medium and devices coupled thereto and maintaining the network requires expensive manpower and equipment. Also, identifying a problem can take a long time if faults have to be manually investigated and tested.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
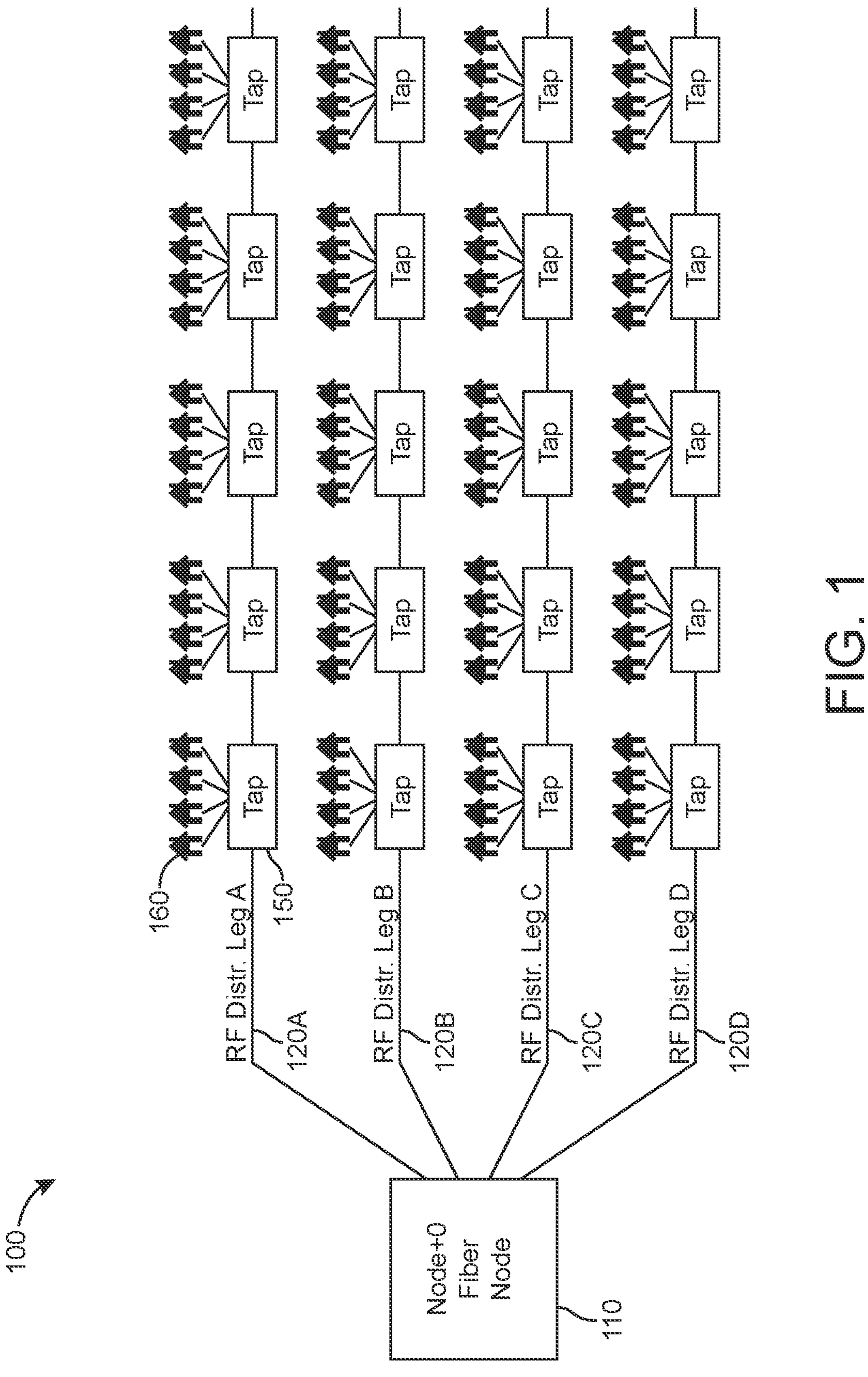
FIG. 1 is a diagram depicting an example communication network, according to some implementations.

The details of various embodiments of the methods and systems are set forth in the accompanying drawings and the description below.

DETAILED DESCRIPTION

The following standard(s), including any draft versions of such standard(s), are hereby incorporated herein by reference in their entirety and are made part of the present disclosure for all purposes: Data Over Cable Service Interface Specification DOCSIS 3.1 and DOCSIS 4.0. Although this disclosure may reference aspects of the above standard(s), the disclosure is in no way limited by the above standard(s).

For purposes of reading the description of the various embodiments below, the following descriptions of the sections of the specification and their respective contents may be helpful:

Section A describes embodiments of systems for and methods of performing diagnostics and/or obtaining diagnostic information for a network; and Section B describes a network environment and computing environment, which may be useful for practicing embodiments described herein.

Some embodiments relate to an amplifier for a cable network. The amplifier includes circuitry configured to provide a diagnostic parameter. A cable network may refer to a communication system where two or more devices communicate across a physical medium including one or more conductors in some embodiments. A cable network may use the DOCSIS 3.1 and/or DOCSIS4.0 protocols.

In some embodiments, the parameter is one or more of: measurements of a frequency response, suckouts in the frequency domain, north upstream echo signal or power, north downstream signal or power, north upstream echo to downstream power ratio, north upstream echo to residual echo power ratio, downstream echo canceller coefficients, south downstream signal or power, upstream information, south downstream echo signal or power, south upstream signal or power, south downstream echo to upstream power ratio, south downstream echo to residual echo power ratio, upstream echo canceller coefficients, and north upstream signal or power.

In some embodiments, the amplifier also includes an echo canceller. In some embodiments, the amplifier is an integrated circuit provided as part of a cable modem. In some embodiments, the parameter is communicated to a diagnostic server using a control channel provided using a cable of the cable network. In some embodiments, the parameter is sampled over time. In some embodiments, the amplifier is part of a cable modem.

In some embodiments, the parameter is two or more of: measurements of a frequency response, suckouts in the frequency domain, north upstream echo signal or power, north downstream signal or power, north upstream echo to downstream power ratio, north upstream echo to residual echo power ratio, downstream echo canceller coefficients, south downstream signal or power, upstream information, south downstream echo signal or power, south upstream signal or power, south downstream echo to upstream power ratio, south downstream echo to residual echo power ratio, upstream echo canceller coefficients, and north upstream signal or power. In some embodiments, the parameter comprises all of: measurements of a frequency response, suckouts in the frequency domain, north upstream echo signal or power, north downstream signal or power, north upstream echo to downstream power ratio, north upstream echo to residual echo power ratio, downstream echo canceller coefficients, south downstream signal or power, upstream information, south downstream echo signal or power, south upstream signal or power, south downstream echo to upstream power ratio, south downstream echo to residual echo power ratio, upstream echo canceller coefficients, and north upstream signal or power.

Some embodiments relate to circuitry. The circuitry includes a first port, a second port, and a circuit. The circuit is configured to amplify a first signal provided from the first port to the second port and a second signal provided from the second port to the first port. The circuit is configured to provide echo cancellation and is configured to provide a diagnostic parameter.

In some embodiments, the parameter is one or more of: measurements of a frequency response, suckouts in the frequency domain, north upstream echo signal or power, north downstream signal or power, north upstream echo to downstream power ratio, north upstream echo to residual echo power ratio, downstream echo canceller coefficients, south downstream signal or power, upstream information, south downstream echo signal or power, south upstream signal or power, south downstream echo to upstream power ratio, south downstream echo to residual echo power ratio, upstream echo canceller coefficients, and north upstream signal or power.

In some embodiments, the circuit is an integrated circuit. In some embodiments, the parameter is communicated to a diagnostic server using a control channel provided using a cable network. In some embodiments, the parameter is sampled over time. In some embodiments, the parameter is two or more of: measurements of a frequency response, suckouts in the frequency domain, north upstream echo signal or power, north downstream signal or power, north upstream echo to downstream power ratio, north upstream echo to residual echo power ratio, downstream echo canceller coefficients, south downstream signal or power, upstream information, south downstream echo signal or power, south upstream signal or power, south downstream echo to upstream power ratio, south downstream echo to residual echo power ratio, upstream echo canceller coefficients, and north upstream signal or power. In some embodiments, the parameter comprises all of: measurements of a frequency response, suckouts in the frequency domain, north upstream echo signal or power, north downstream signal or power, north upstream echo to downstream power ratio, north upstream echo to residual echo power ratio, downstream echo canceller coefficients, south downstream signal or power, upstream information, south downstream echo signal or power, south upstream signal or power, south downstream echo to upstream power ratio, south downstream echo to residual echo power ratio, upstream echo canceller coefficients, and north upstream signal or power.

Some embodiments relate to a method. The method includes providing a first signal from a downstream port to an upstream port using a circuit and providing a second signal from the upstream port to the downstream port using the circuit. The method also includes performing echo cancellation using the circuit, and sampling a diagnostic parameter at a location between the downstream port and the upstream port. The circuit includes the downstream port and the upstream port. The upstream port is configured to be coupled to a first communication medium, and the downstream port being configured to be coupled to a second communication medium.

In some embodiments, the parameter is one or more of: measurements of a frequency response, suckouts in the frequency domain, north upstream echo signal or power, north downstream signal or power, north upstream echo to downstream power ratio, north upstream echo to residual echo power ratio, downstream echo canceller coefficients, south downstream signal or power, upstream information, south downstream echo signal or power, south upstream signal or power, south downstream echo to upstream power ratio, south downstream echo to residual echo power ratio, upstream echo canceller coefficients, and north upstream signal or power.

In some embodiments, the circuit is an integrated circuit. In some embodiments, the parameter is sampled over time.

A. Systems for and Methods of Providing Diagnostic Information

Various embodiments disclosed herein are related to a method, a system, and a non-transitory computer readable medium storing instructions for performing diagnostics and/or obtaining diagnostic information for one or more communication links or media. In some embodiments, systems and methods employ amplifiers that are configured to provide diagnostic information. The systems and methods can employ smart amplifiers in a cable network that reduce a need for maintenance personnel to employ additional measuring devices to perform conventional diagnostic techniques. In some embodiments, the smart amplifier is configured with a diagnostic component that is installed on top of the smart amplifier that can identify problems or faults in the network remotely without the need for a technician to arrive in the field and/or can measure the performance of the network.

In some embodiments, hardware and/or software for a diagnostic component is integrated with the amplifier. In some embodiments, the amplifier and diagnostic component are integrated on a single integrated circuit in a single integrated circuit package. In some embodiments, the amplifier and diagnostic component are integrated on separate integrated circuits in a multi-chip integrated circuit package. In some embodiments, the amplifier employs echo cancelling techniques. In some embodiments, the amplifier (e.g., a smart amplifier) includes a cable modem (e.g., embedded) that uses a communication channel between the amplifier and the head end or central office to transfer diagnostic information and requests for tests or diagnostic information. In some embodiments, the diagnostic information is provided without dedicated external measuring devices that connect to the medium in the field. In some embodiments, the amplifier, cable modem, and diagnostic component are integrated on a single integrated circuit in a single integrated circuit package. In some embodiments, the amplifier, cable modem, and diagnostic component are integrated on separate integrated circuits in a multi-chip integrated circuit package.

A communication medium may refer a physical transmission medium, such as, one or more wires, cables, or other medium of routes or channels for signals in some embodiments. A cable modem may refer to a device for communicating signals on a cable network in some embodiments. The cable modem or amplifier can have a north port coupled to a first medium (e.g., first cable) and a south port coupled to a second medium (e.g., second cable).

Referring to FIG. 1, an example communication network 100 is a cable network or other communication system. In the communication network 100, a node 110 is coupled to four legs 120A, 120B, 120C, 120D in parallel. Although only four legs are illustrated, in many implementations, a greater or fewer number of legs may be utilized. The node 110 may be coupled to another node or other network (not illustrated). In one configuration, each leg 120 is coupled to multiple taps 150 in series, where each tap 150 is coupled to network devices 160 (e.g., routers, switches or modems (e.g., cable modems)) operated by users in parallel. Devices 160 may be deployed in residences, as shown, as well as at businesses or other enterprises, as well as in other locations (apartments, classrooms, etc.). Devices 160 can be edge devices for DOCSIS 3.0, DOCSIS 2.0, DOCSIS C, and/or Euro DOCSIS systems. Although only four devices 160 are shown connected to each tap 150, in many implementations, a greater or fewer number of devices 160 may be connected. Furthermore, each device 160 may be further coupled to a number of devices (e.g., switches, routers, modems, computing devices, smart televisions, video game consoles, home automation devices, Internet-of-Things (IoT) devices, etc.) In this configuration, the node 110 allows a large number (e.g., eighty or more) of network devices 160 to communicate with each other or with an external network. In other embodiments, a different number of legs 120, taps 150, and network devices 160 may be implemented by the network 100. In other embodiments, the legs 120, taps 150, and network devices 160 may be arranged in a different configuration than shown in FIG. 1.

A node 110 is a circuit or a system that enables taps 150 or network devices 160 to communicatively couple to each other or to an external network. In one aspect, the node 110 is operated by a service provider (e.g., broadband provider, cable provider, Internet Service Provider (ISP), etc.). The node 110 may be a fiber node conforming to DOCSIS 3.1 or a higher standard. The node 110 can be any interface between a cable modem termination system and a cable modem used by subscribers in some embodiments and can be a router, mode, or router/modem combination. The node 110 may accommodate communication of a large number of network devices 160 through multiple legs 120. In one aspect, the node 110 communicates with the taps 150 or the network devices 160 in different legs 120 through orthogonal frequency division multiplexing (OFDMA) to improve communication bandwidth. In particular, the node 110 may select Fast Fourier Transform (FFT) outputs of signals received through the legs 120A-D for reducing noise or reflection from other legs to improve signal to noise ratio. Additional operations and implementations of the node 110 are possible.

A tap 150 is a component that enables a set of network devices 160 to communicatively couple to the node 110. In one aspect, the tap 150 splits a signal from the node 110, and forwards the split signals to a set of network devices 160. In another aspect, the tap 150 aggregates signals from the set of network devices 160, and forwards the aggregated signal to the node 110. Taps 150 and legs 20*a*-D can employ repeaters or amplifiers to amplify the signal as the signal is provided across the communication medium. The amplifiers can be configured for diagnostic operations as described below.

A network device 160 is a component that is operated by a user. Examples of the network device 160 include a router, a switch, a modem, etc. The network device 160 may be coupled to a computing device such as a laptop, a personal computer, a tablet computer, a smart phone, a TV, a speaker, etc., that are operated by a user. Through the network device 160, the computing devices can communicate with the node 110, other network devices 160 in the network 100 or other devices coupled to an external network.

Figure 2A:
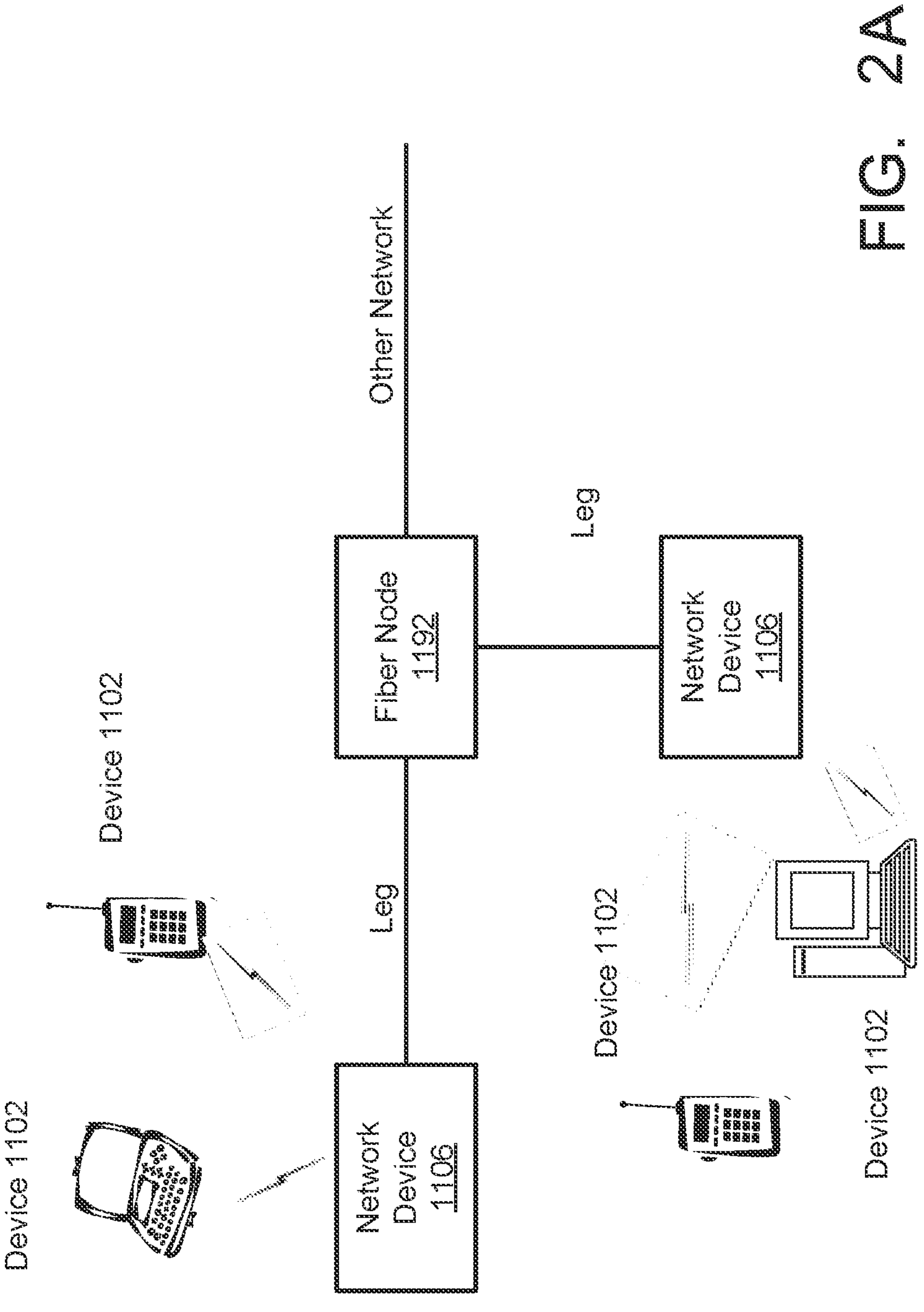
FIG. 2A is a block diagram depicting an embodiment of a network environment including one or more network devices in communication with one or more devices.

Additional examples and descriptions of the node 110, the network devices 160 and computing devices are provided below with respect to FIGS. 2A through 2C.

Figure 3:
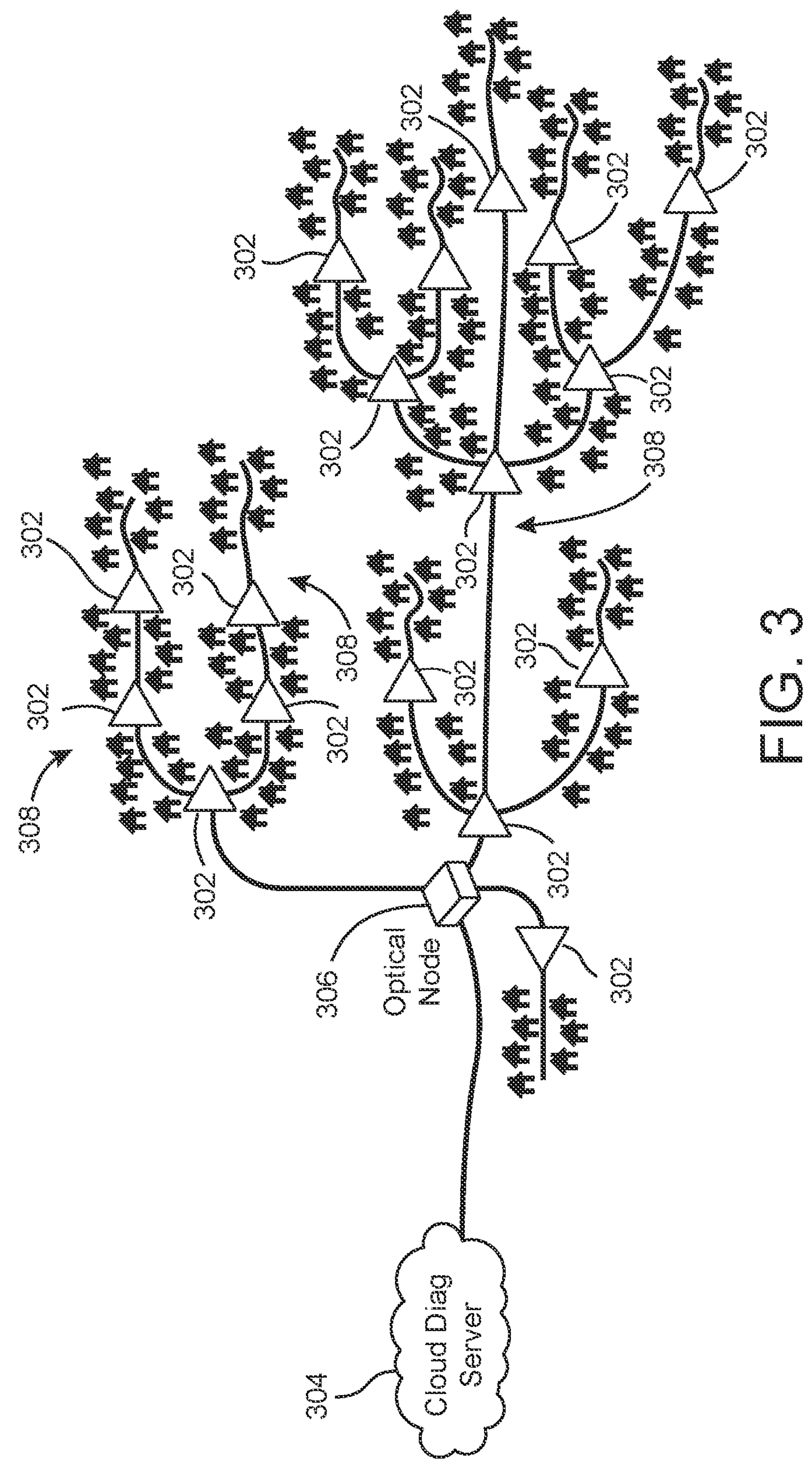
FIG. 3 is a schematic drawing of a communication network, according to some embodiments.

With reference to FIG. 3, communication system or network 100 (FIG. 1) can include amplifiers 302 configured to provide diagnostics and/or diagnostic information. Amplifiers 302 can be in communication with a server 304 (e.g., a cloud server) via an optical node 306. Amplifiers 302 can be deployed on various legs 308 associated with a residence or group of residences as well as businesses or other enterprises (apartments, classrooms, hospitals, etc.). Amplifiers 302 can each include an echo canceller for full duplex communications and one or more analog to digital converters and digital to analog converters. Amplifiers 302 each include a diagnostic component that samples and stores various parameters between a north and south port and provided the parameters for further analysis/diagnostics in some embodiments.

Diagnostics can be used during initial maintenance (e.g., to make measurements and assist setting initial parameters (e.g., automatic gain control backoff parameters, equalizer coefficients, etc.)), during normal operation, periodic maintenance, (e.g., to monitor normal operation and performance, receive and transmit levels, signal to noise (SNR) performance, interference levels at the north and south port, temperature stability, analog to digital converter (ADC) backoff training etc.), and/or for full network diagnostics (e.g., radio frequency (RF) levels issues, RF levels setup, passive or active faults, tap issues, noise issues, home ingress noise, etc.). In some embodiments, the amplifiers 302 perform data capture and spectrum analysis timing during upstream active transmission, during upstream quiet period, or over specific time during the day. The data capture and spectrum analysis can involve parameters including but not limited to: measurements of a specific upstream and/or downstream channel characteristics and measurements of a specific frequency response. In some embodiments, the parameters include but are not limited to: downstream information, north upstream echo signal and power information, north downstream signal and power information, north upstream echo to downstream power ratio information, north upstream echo to residual echo power ratio information, downstream echo canceller coefficients information, south downstream signal and power, upstream information, south downstream echo signal and power information, south upstream signal and power information, south downstream echo to upstream power ratio information, south downstream echo to residual echo power ratio information, upstream echo canceller coefficients information, and north upstream signal and power information. The diagnostic information can be provided to server 304. Server 304 can provide requests for diagnostic information to amplifiers 302 and provide configuration information to amplifiers 302 for configuring or adjusting operation of amplifiers 302. For example, software updates can be provided from server 304 to amplifiers 302. Server 204 can be a head end server, multiple servers, or a cloud server in some embodiments.

Information, data or signals can be captured or monitored at various points (e.g., probe points (PPs), test points (TPs) or test ports) including but not limited to an upstream input, a downstream input, an upstream output, a downstream output, an upstream echo canceller coefficient output, an upstream echo canceller output, a downstream echo canceller coefficient output, and a downstream echo canceller output. Exemplary time domain capture parameters for the signals at the various points are provided in Table I below.

TABLE I

Time Domain Capture Parameters.

| Parameter | Function |
|---|---|
| Probe Point | PP-1: US Input<br>PP-2: US Output<br>PP-3: DS Input<br>PP-4: DS Output<br>PP-5: US EC Coefficients<br>PP-6: US EC Output<br>PP-7: DS EC Coefficients<br>PP-8: DS EC Output |
| Sample Rate | Capture sample rate<br>Unit 1 Hz |
| Center Frequency | The center frequency of this capture<br>Unit•1 Hz |
| Timestamp | The timestamp of the capture begins |
| Capture Duration | The duration of the capture<br>Unit '1 us |
| Capture Data | The time domain data samples at the Capture Probe Point '16b signed real, 16b signed imaginary |

Exemplary spectrum domain analysis capture parameters for the signals at the various points are provided in Table II below.

TABLE II

Spectrum Analysis Parameters.

| Parameter | Function |
|---|---|
| Probe Point | PP-1: US Input<br>PP-2: US Output<br>PP-3: DS Input<br>PP-4: DS Output<br>PP-5: US EC Coefficients<br>PP-6: US EC Output<br>PP-7: DS EC Coefficients<br>PP-8: DS EC Output |
| Sample Rate | Capture sample rate<br>Unit 1 Hz |
| Center Frequency | The center frequency of this capture<br>Unit•1 Hz |
| FFT Bin Space | The FFT bin space<br>Unit 1 Hz |
| Output Type | O = Complex IQ samples, 1 = Power linear (per bin), 2 = power in dB (per bin |
| Measure Type | O = Raw (IQ samples), 1 = Average, 2 = Max, 3 = Min |
| Wln Type | 0 = Rectangular, 1 = Hanning, 2 = Hamming, 3 = Blackman, 4 = Blackman-Harris |
| Timestamp | The timestamp of the spectrum analysis begins |
| Num Blocks | The number of FFT blocks measure. |
| Spectrum Data | If Output Type = 0 (IQ) frequency domain data samples 16b signed real, ·16b signed imaginary.<br>If Output Type == 1 (Power) power (linear) per bin unsigned 2.30.<br>If Output Type 2 (dB) power in dB per bin signed 9.7 |

In some embodiments, server 304 is a cloud-based diagnostic server in communication with amplifiers 302 disposed upstream of an optical node such as node 306. In some embodiments, optical node 306 is optional, or server 304 is disposed downstream of node 306. Amplifiers 302 can be disposed in a cascaded tree structure having one or more downstream (e.g., south) ports coupled to cable modems (e.g., in residences) or to one or more upstream (e.g., north) ports of another amplifier and an upstream port coupled to the optical node or one or more downstream ports of another amplifier. A diagnostic execution command and the diagnostic result are communicated through a control channel (e.g., a diagnostic communication channel (DCC)). The diagnostic execution command and the diagnostic result are provided either locally between the amplifier 302 and a near computer remotely between the amplifier 302 and server 304, or over a network such as a hybrid fiber coax (HFC) network. The diagnostic execution command can include a time domain capture command and/or a spectrum analysis command (e.g., identifying one or more of the parameters are shown in Tables I and II), the north port number for the north probe points, etc. The diagnostic result can include the captured data for the time domain capture command or the spectrum data for the spectrum analysis command in some embodiments. Echo measurement results can be provided in a graphical or numerical form in some embodiments.

In some embodiments, the amplifier 302 is configured as a smart amplifier and provides diagnostic information so that the diagnostic server (e.g., server 304) can identify and locate the faults behind a south port and north port of an amplifier 302. The smart amplifier can be configured to perform the local diagnostics of its south ports and north ports, and/or report the diagnostic results to the diagnostic server (e.g., server 304). The diagnostic server uses the reported information from all amplifiers 302 and analyzes the reported information to determine a given fault's location (identification of its associated repeater/south port or repeater/north port) in some embodiments. The diagnostic server uses the reported information from all amplifiers 302 and analyzes the reported information to determine identification of its associated cable modem or port thereof in some embodiments. In some embodiments, the diagnostic server uses the reported information to identify all client or cable modems residing behind each south port of the amplifier 302. In some embodiments, a converged cable access platform (CCAP) commands cable modems to transmit wideband probes for DOCSIS 3.1/4.0 modems or the equivalent signal for DOCSIS 3.0 modems. The amplifiers 302 report the received power to the diagnostic server to identify the amplifiers 302 through which the probe passed. With the reported information from all amplifiers 302, the diagnostic server can determine a given cable modem's location (identification of its associated repeater/south port) in some embodiments. The diagnostic server can be a hand held device, a lap top, or other computing system in some embodiments.

In some embodiments, echo response variations can be monitored over time to provide useful insights about a physical plant. Periodic sampling of the echo cancellation coefficients by the amplifiers 302 or other devices can give a good estimation for the echo response changes and physical plant stability. In some embodiments, monitoring other channel responses related coefficient short time and long-time variations, like adaptive line equalization, received signal power spectral density and power can be used to detect and locate medium (e.g., cable) anomalies. For example, abrupt response changes due to abnormalities can create sudden increases in the echo cancellation coefficient change (also called EC coefficient noise). When cable response is stable, low coefficient noise is expected. Monitoring EC coefficient noise can be used to identify potential faults in some embodiments. In some embodiments, every echo probe time EC coefficients are compared to the EC coefficients of the previous period probe, then difference is averaged across all bins. After approximately 50 seconds of run, cable response transients can be seen. Transients can be determined by server 304 from data provided by amplifiers 302 in some embodiments. By monitoring EC coefficients for short time and long time variations, stationary and transient cable anomalies can be detected and located in some embodiments. By monitoring other channel response related coefficients for short time and long time variations (e.g., adaptive line equalization, received signal power spectral density and power) transient cable anomalies can be detected and located in some embodiments. In some embodiments, a plant temperature change can be detected by monitoring EC coefficients over a large period of time (e.g., several minutes), the drift rate for each frequency-domain bin can be detected. When this estimation is averaged across all bins, the current plant temperature gradient in the plant can be estimated.

Figure 4:
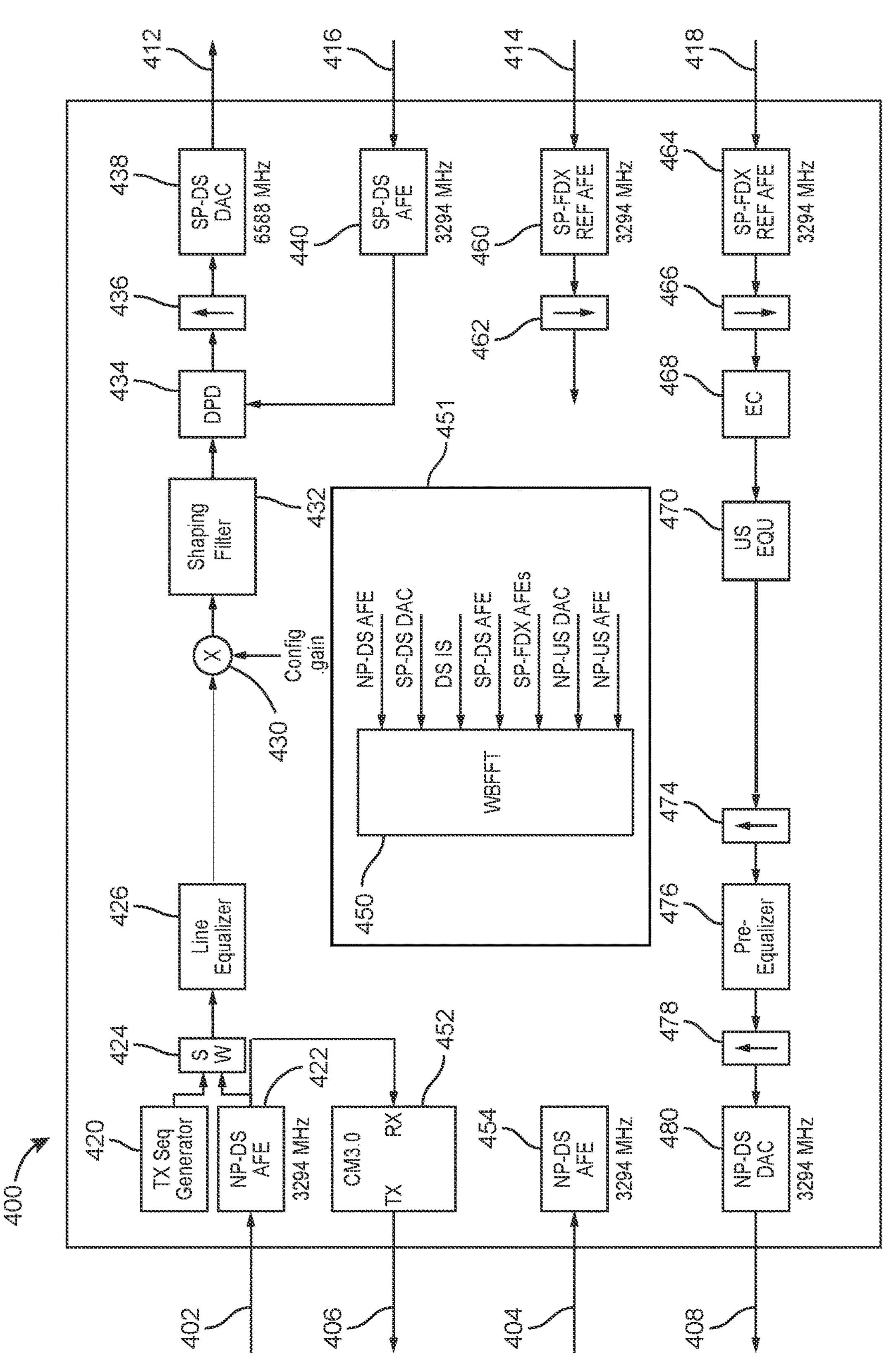
FIG. 4 is a block diagram of an amplifier for use on the communications network illustrated in FIGS. 1 and 3 according to some embodiments.

With reference to FIG. 4, an amplifier 400 can be used as one of amplifiers 302 in communication networks 100 and 300 (FIGS. 1 and 3). Amplifier 400 can be provided on a single integrated circuit (IC) substrate or within a single IC package in some embodiments. Amplifier 400 includes a downstream input 402 (e.g., north port), a downstream output 412 (e.g., south port), a power amplifier output 406, a downstream analog front end input 404 (e.g., north port), an upstream output 408 (e.g., north port), and upstream input 418 (e.g., south port), an echo canceller reference input 414 (e.g., south port), and upstream input 418 (e.g., south port). Input 402 is coupled to a downstream north port analog front end circuit 422, which is coupled to a multiplexer or switch 424. Switch 424 is also coupled to a transmit sequence generator 420. Switch 424 provides a signal from circuit 422 or generator 420 to equalization circuit 426. Circuit 452 is coupled to circuit 422 and output 406. Output 406 can also be directly connected to the output of circuit 420. A fast Fourier transform (FFT) circuit 450 is coupled to receive a signal from circuit 422. Circuit 450 is part of processor 451 in some embodiments.

Equalization circuit 426 is coupled to a multiplier 430. Equalization circuit 426 is a line equalization circuit in some embodiments. Multiplier 430 is coupled to a shaping filter 432 which is configured to compensate for inaccuracies in the output downstream power spectral density in some embodiments. Multiplier 430 receives a configurable gain and provides a multiplied signal to circuit 432. A digital predistortion circuit 434 is coupled to circuit 432 and an upconverter circuit 436 (e.g., baseband to RF). Digital predistortion circuit 434 is configured to provide predistortion to reduce errors. Circuit 436 is coupled to a digital to analog converter 438 which is coupled to output 412. Digital predistortion circuit 434 receives a signal from a south port downstream analog front end circuit 416.

Input 414 is coupled to a south port downstream reference analog front end circuit which is coupled to downconverter circuit 462 (e.g., RF to baseband) which is coupled to echo canceller 468. Input 418 is coupled to south port downstream analog front end circuit 464 which is coupled to circuit 466 which is coupled to canceller 468. Canceller 468 has an output coupled to upstream equalizer 470. Circuit 470 is coupled to upconverter circuit 474 (e.g., base band to RF) which is coupled to a preequalizer 476. Preequalizer 476 performs equalization and is coupled to converter 478 which is coupled to a north point upstream DAC. 480. DAC 480 is coupled to output 408. In some embodiments, the upstream and downstream frequencies are the same or different form each other.

A fast Fourier transform (FFT) circuit 450 is coupled to receive a signal from circuit 422, a signal from DAC 438, a signal from circuit 426, a signal from circuit 440, a signal from circuit 464, a signal from DAC 480, and circuit 454. Circuit 450 is configured to perform a fast Fourier transform on the signals provided to circuit 450 in some embodiments. Circuit 450 is configured to provide FFT output samples (e.g., IQ samples). Circuit 450 is a wide band FFT circuit in some embodiments. The signals input to circuit 450 can be sampled and monitored for communication by processor 451 as diagnostic information in some embodiments.

Amplifier 400 is configured to have test ports at input 402, input 418, input 404, input 416, between canceller 468 and equalizer circuit 470, between multiplier 430 and circuit 432, input 414, and between converter 478 and DAC 480. The test ports can provide time domain and frequency domain information (e.g., time domain samples, FFT output samples (IQ samples), and power spectral density). In some embodiment, amplitude histogram is provided for the signals at the test ports. Time domain samples are baseband samples (e.g., complex samples) around a configurable center frequency in some embodiments.

Amplifier 400 can be configured to provide echo canceller diagnostic. The echo canceller diagnostic information can include EC coefficients in time domain and frequency domain, EC coefficient signal to noise ratio (SNR) (e.g., accuracy), echo response change rate, upstream to residual echo power ratio, echo to upstream power ratio, and echo to residual echo ratio. EC data diagnostics in frequency and time domain is very useful for fault detection in the cable plant in some embodiments. Time domain coefficients can detect faults, like unexpected reflections, impaired cables, bad connectors, etc. Time domain EC diagnostics also provide information on where those impairments are located. EC coefficients data is useful and can be provided for both system that apply full duplex operation (e.g., DOCSIS 4.0 FDX) and that do not apply full duplex operation (e.g., DOCSIS 4.0 FDD spec, or DOCSIS 3.1 spec). Amplifier 400 can be configured to provide downstream noise to power (NPR) at input 402 and output 403 (e.g., per configurable frequencies), downstream equalizer coefficients, upstream pre-equalizer coefficients, north port cable insertion loss change rate, composite power at input 418, input 404, input 404, and input 416, north port interference histogram, and peak to average ratio on the test ports in some embodiments. Equalizer coefficients can be sampled from equalizers 426 and 470 and pre-equalizer 476 which are adaptive equalizers configured by coefficients in some embodiments. Analog front end circuits 422, 440, 460, and 464 provide signal interfacing and conditioning for signals provided to amplifier 400.

In some embodiments, amplifier 400 includes processor 451 configured to sample, store, and communicate diagnostic information. The diagnostic information can be provided in a frame. A frame may refer to a digital data transmission unit in some embodiments. In some embodiments, the processor 451 is implemented as a field-programmable gate array, digital signal processor, an application-specific integrated circuit, hardware, a software executing processor, or state machines. In some embodiments, the processor 451 is part of physical and/or control layers of a cable modem. The processor 451 can be configured to perform communication operations, frame building and processing, sampling operations, storage operations, control channel operations, connection setup, filtering, etc. in some embodiments. Instructions for the processor 451 are stored in a non-transitory medium in some embodiments. The non-transitory medium may be one or more circuits or devices (e.g., RAM, ROM, Flash memory, hard disk storage) for storing data and/or computer code for completing and/or facilitating the various processes described herein. The non-transitory medium may be or include non-transient volatile memory, non-volatile memory, and non-transitory computer storage media.

Processor 451 can store sampled parameters in a register or other memory and provide the parameters using a transmitter and can receive commands using a receiver. Sampling rates can be set by commands provided from server 304. The commands can identify transmission rates for the sampled data. In some embodiments, processor 451 is configured to store a time series or set of historical parameters and periodically send the set of historical parameters at transmission intervals. In some embodiments, processor 451 can identify parameters that indicate a fault and send an indication of the fault to server 304.

Amplifier 400 is configured to provide echo cancellation at the south port, which enables full duplex (FDX) transmissions. The amplifier 400 provides more flexible deployment options, extended FDX node coverage and a noise suppression mechanism to reduce noise from adjacent ports (upstream) and prevents noisy transmissions in some embodiments. Improving upchannel conditions in communication network 100 or 300 enhances network performance/capacity in some embodiments. The amplifier 400 includes or is part of an embedded cable modem for communication with the node for provisioning and management. The systems and methods advantageously extend network manageability to the amplifier/repeater level in some embodiments. Improving down channel conditions in communication networks 100 and 300 enhances network performance/capacity in some embodiments. In some embodiments, the amplifier 400 includes an adaptive upstream equalizer to correct for frequency response non-idealities.

Amplifier 400 is configured to provide extensive diagnostics at south port and north port, and enable localization of faults for faster and more effective field issue resolution in some embodiments. In some embodiments, automatic equalization and digital uptilt in the downstream is achieved. Amplifier 400 can be configured as a repeater in some embodiments. Input 402 can be coupled to an equalizer and low noise amplifier provided as part of the integrated circuit for amplifier 400 in some embodiments. Output 408 can be coupled to an equalizer and a power amplifier provided as part of the integrated circuit for amplifier 400 in some embodiments. Output 408 can be coupled to a power amplifier provided as part of the integrated circuit for amplifier 400 in some embodiments. A line equalizer and an echo canceller can be provided for the downstream signal between the north port and the south port in some embodiments.

The circuitry may include discrete interconnected hardware components and/or integrated circuit components. Components may be combined on a single integrated circuit die, distributed among multiple integrated circuit dies, or implemented using a circuit board. Multiple Chip Module (MCM) of multiple integrated circuit dies in a common package can be used. The integrated circuit package can be a combination of two or more packages in some embodiments. Circuit or circuitry may refer to any active or passive component and connections thereto as well as combinations thereof. Circuitry may further include or access instructions (e.g., software or firmware instructions) for execution by the circuitry. The circuitry may include processors, memory, application specific circuits, programmable logic devices, etc.

An amplifier may refer to an electronic device that adjusts and/or repeats the voltage, current, or power of a signal in some embodiments. An amplifier can include a power amplifier, a low noise amplifier, equalizers, and/or other conditioning circuits in some embodiments. The amplifier can have a gain (e.g., an adjustable gain, a unity gain, etc.). An amplifier can be configured as a repeater. A repeater may refer to an electronic device that amplifies or regenerate an incoming signal before retransmitting it in some embodiments. The repeater is incorporated in networks to expand its coverage area (e.g., a signal booster). The repeater can operate at physical layer of an OSI model in some embodiments. A switch may refer to any type of switching device including but not limited to transistors in some embodiments. A transistor may refer to any type of transistors including field effect transistors FETS, insulated gate FETs, bipolar junction transistors, etc.

Diagnostic information may refer to signal or data analysis that can be used to diagnose or predict operational characteristics (e.g., faults, operating levels, usage, expected network performance, etc.) in some embodiments. A north port may refer to an input and/or output interface that is coupled to a source or head end side of a network in some embodiments. A south port may refer to an input and/or output interface that is coupled to a client or customer side of a network in some embodiments. Downstream may refer to a direction in a network from the north port to the south port in some embodiments. Upstream may refer to a direction in a network from the south port to the north port in some embodiments.

Equalization may refer to a process that reduces distortion incurred by a signal transmitted through a channel in some embodiments. Equalization renders the frequency response across a medium (e.g., a cable) flatter from end-to-end of the frequency domain in some embodiments. When a channel has been equalized, the frequency domain attributes of the signal at the input are faithfully reproduced at the output in some embodiments.

An equalizer may refer to a device that performs equalization. Equalizers can be embodied as one or more filters (e.g., a digital filter) that cancel out any group delay and phase delay between different frequency components in some embodiments. An equalizer can be disposed at a front end of an amplifier or line extender to compensate for the amount of cable loss ahead of it (to compensate for cable tilt) in some embodiments. Tilt on the signal depends on length and the size of the medium (e.g., cable) in some embodiments. In some embodiments, an equalizer is an adaptive digital circuit that compensates for a digitally modulated signal's in-channel complex frequency response impairments. Complex frequency response includes amplitude (or magnitude)-vs.-frequency and phase-vs.-frequency. Adaptive equalizers can compensate for cable network issues such as micro-reflections, amplitude tilt or ripple, and group delay. The adaptive equalizer can use an algorithms to derive coefficients for an equalizer solution. The equalizer coefficient may refer to data or a signal that configures a digital filter in some embodiments. The filter is configured with essentially the opposite complex frequency response of the channel in some embodiments. Equalizer coefficients yield maximum modulation error ratio (MER) by minimizing total impairments including inter-symbol interference (ISI), within the limits of the equalizer's capabilities in some embodiments. A preequalizer may refer to a device that performs equalization before processing of a signal in some embodiments.

Echo canceller may refer to a circuit configured to reduce an affect of an echo in a portion of a medium in some embodiments. An echo signal may refer to a signal representing an echo in a portion of a medium in some embodiment. Echo canceller data diagnostics may refer to a process of monitoring and analyzing the performance and data associated with an echo canceller in some embodiments. Echo canceller data diagnostics may include but are not limited to: monitoring key performance metrics such as echo return loss (ERL), echo return loss enhancement (ERLE), and echo path delay (EPD), analyzing the quality of the incoming and outgoing signals to identify any anomalies or issues that may affect the echo canceller's operation, determining the statistics related to signal processing, such as signal levels, frequency response, and signal-to-noise ratios, to ensure that the echo canceller is functioning correctly, keeping a record of any errors or alarms generated by the echo canceller, which can help in diagnosing issues and taking corrective actions, determining the length and characteristics of the residual echo tails, which can provide insights into the echo canceller's performance and any potential improvements needed, analyzing the adaptive filter coefficients used by the echo canceller to adapt to changing echo paths, and/or monitoring the performance of the echo canceller over time to detect any degradation or changes in performance.

Measurement of north upstream echo signal or power may refer to measurement of a characteristic for a north port of an upstream echo signal or power associated therewith in some embodiments. Measurement of suckouts in the frequency domain may refer to a measurement of a notch in a response in some embodiments. Suckouts may be due to temperature, connections, and other phenomena in some embodiments. Measurement of north downstream echo signal or power may refer to measurement of a characteristic for a north port of a downstream echo signal or power associated therewith in some embodiment. Measurement of north upstream to downstream power ratio may refer to measurement of a comparison of power for a north port of a downstream received echo signal to a north port of a upstream received echo signal in some embodiments. Measurement of north upstream echo to residual echo power ratio may refer to measurement of a residual power after echo cancellation for a north port of a downstream desired signal and a north port of a upstream echo signal in some embodiments. Measurement of downstream echo canceller coefficients may refer to measurement of echo canceller coefficients for a downstream portion of the medium. Measurement of south downstream signal or power may refer to a measurement of a characteristic for a south port of a downstream echo signal or power associated therewith in some embodiments. Measurement of upstream information may refer to measurement of characteristics associated with an upstream portion of a medium. Measurement of south upstream signal or power may refer to a measurement of a characteristic for a south port of an upstream desired signal or power associated therewith in some embodiments. Measurement of south upstream to downstream echo power ratio may refer to measurement of comparison of power for a south port of a downstream echo signal to an upstream desired signal in some embodiments. Measurement of south residual echo power ratio may refer to measurement of a residual power after echo cancellation for a south port of a downstream echo signal and a south port of a upstream desired signal in some embodiments. Measurement of downstream echo canceller coefficients ratio may refer to measurement of echo canceller coefficients for a downstream portion of the medium. Echo canceller coefficients may refer to data (e.g., a set of numerical parameters) used in an echo canceller (e.g., a digital signal processing system designed to remove or reduce the echo or reverberation in a communication system) in some embodiments. Echo canceller coefficients can be determined and adjusted by the echo canceller algorithm to effectively reduce the reflected signals in some embodiments. Echo canceller coefficients model and adapt to the characteristics of the echo path, including the delay, attenuation, and frequency response of the reflected signal in some embodiments.

An embedded cable modem may refer to a modulating demodulating device for a cable network in some embodiments. A diagnostic server may refer to a computing device that is configured to analyze diagnostic information in some embodiments. A control channel may refer a channel used to provide a control information (e.g., diagnostic information). In some embodiments, the control channel is different that a channel for providing content information and is one the same medium. A cable segment may refer to a portion of a cable network that connects a group of subscribers to a cable modem termination system in some embodiments. A cable segment may serve a certain number of homes or businesses that share the same coaxial cable infrastructure in some embodiments.

B. Computing and Network Environment

Having discussed specific embodiments of the present solution, it may be helpful to describe aspects of the operating environment as well as associated system components (e.g., hardware elements) in connection with the methods and systems described herein. Referring to FIG. 2A, an embodiment of a network environment is depicted. In brief overview, the network environment includes a communication system that includes one or more network devices 1206, one or more communication devices 1202 and a fiber node 1292. The one or more network devices 1206 may be the network device 160 in FIG. 1, the fiber node 1292 may be the node 110 in FIG. 1, and the one or more communication devices 1202 may be computing devices. The communication devices 1202 may for example include laptop computers 1202, tablets 1202, personal computers 1202 and/or cellular telephone devices 1202. The details of an embodiment of each communication device and/or network device are described in greater detail with reference to FIGS. 2B and 2C. The network environment can be an ad hoc network environment, an infrastructure network environment, a subnet environment, etc.

The network devices 1206 may be operably coupled to the fiber node 1292 via local area network connections. The fiber node 1292, which may include a router, gateway, switch, bridge, modem, system controller, appliance, etc., may provide a local area network connection for the communication system. Each of the network devices 1206 may have an associated antenna or an antenna array to communicate with the communication devices 1202 in its area. The communication devices 1202 may register with a particular network device 1206 to receive services from the communication system (e.g., via a SU-MIMO or MU-MIMO configuration). For direct connections (e.g., point-to-point communications), some communication devices 1202 may communicate directly via an allocated channel and communications protocol. Some of the communication devices 1202 may be mobile or relatively static with respect to the network device 1206.

In some embodiments a network device 1206 includes a device or module (including a combination of hardware and software) that allows communication devices 1202 to connect to a wired network using Wi-Fi, or other standards. A network device 1206 may be configured, designed, and/or built for operating in a wireless local area network (WLAN). A network device 1206 may connect to a router (e.g., via a wired network) as a standalone device in some embodiments. In other embodiments, a network device can be a component of a router. A network device 1206 can provide multiple devices 1202 access to a network. A network device 1206 may, for example, connect to the devices 1202 through a wired Ethernet connection, a wireless Wi-Fi connection, or both. A network device 1206 may be built and/or configured to support a standard for sending and receiving data using one or more radio frequencies. Those standards, and the frequencies they use may be defined by the IEEE (e.g., IEEE 802.11 standards). A network device may be configured and/or used to support public Internet hotspots, and/or on an internal network to extend the network's Wi-Fi signal range.

In some embodiments, the network devices 1206 may be used for (e.g., in-home or in-building) wireless networks (e.g., IEEE 802.11, Bluetooth, ZigBee, any other type of radio frequency based network protocol and/or variations thereof). Each of the communication devices 1202 may include a built-in radio and/or is coupled to a radio. Such communication devices 1202 and/or network devices 1206 may operate in accordance with the various aspects of the disclosure as presented herein to enhance performance, reduce costs and/or size, and/or enhance broadband applications. Each communication devices 1202 may have the capacity to function as a client node seeking access to resources (e.g., data, and connection to networked nodes such as servers) via one or more network devices 1206.

The network connections may include any type and/or form of network and may include any of the following: a point-to-point network, a broadcast network, a telecommunications network, a data communication network, and a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

The fiber node 1292, the communications device(s) 1202 and network device(s) 1206 may be deployed as and/or executed on any type and form of computing device, such as a computer, network device or appliance capable of communicating on any type and form of network and performing the operations described herein. FIGS. 12B and 12C depict block diagrams of a computing device 1200 useful for practicing an embodiment of the fiber node 1292, the communication devices 1202 or the network device 1206. As shown in FIGS. 12B and 12C, each computing device 1200 includes a central processing unit 1221, and a main memory unit 1222. As shown in FIG. 12B, a computing device 1200 may include a storage device 1228, an installation device 1216, a network interface 1218, an I/O controller 1223, display devices 1224*a*-1224*n*, a keyboard 1226 and a pointing device 1227, such as a mouse. The storage device 1228 may include, without limitation, an operating system and/or software. As shown in FIG. 2C, each computing device 1200 may also include additional optional elements, such as a memory port 1203, a bridge 1270, one or more input/output devices 1230*a*-1230*n* (generally referred to using reference numeral 1230), and a cache memory 1240 in communication with the central processing unit 1221.

The central processing unit 1221 is any logic circuitry that responds to and processes instructions fetched from the main memory unit 1222. In many embodiments, the central processing unit 1221 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 1200 may be based on any of these processors, or any other processor capable of operating as described herein.

Main memory unit 1222 may be one or more memory chips capable of storing data and allowing any storage location to be directly accessed by the microprocessor 1221, such as any type or variant of Static random access memory (SRAM), Dynamic random access memory (DRAM), Ferroelectric RAM (FRAM), NAND Flash, NOR Flash and Solid State Drives (SSD). The main memory 1222 may be based on any of the above described memory chips, or any other available memory chips capable of operating as described herein. In the embodiment shown in FIG. 12B, the processor 1221 communicates with main memory 1222 via a system bus 1250 (described in more detail below). FIG. 12C depicts an embodiment of a computing device 1200 in which the processor communicates directly with main memory 1222 via a memory port 1203. For example, in FIG. 12C the main memory 1222 may be DRDRAM.

Figure 2B:
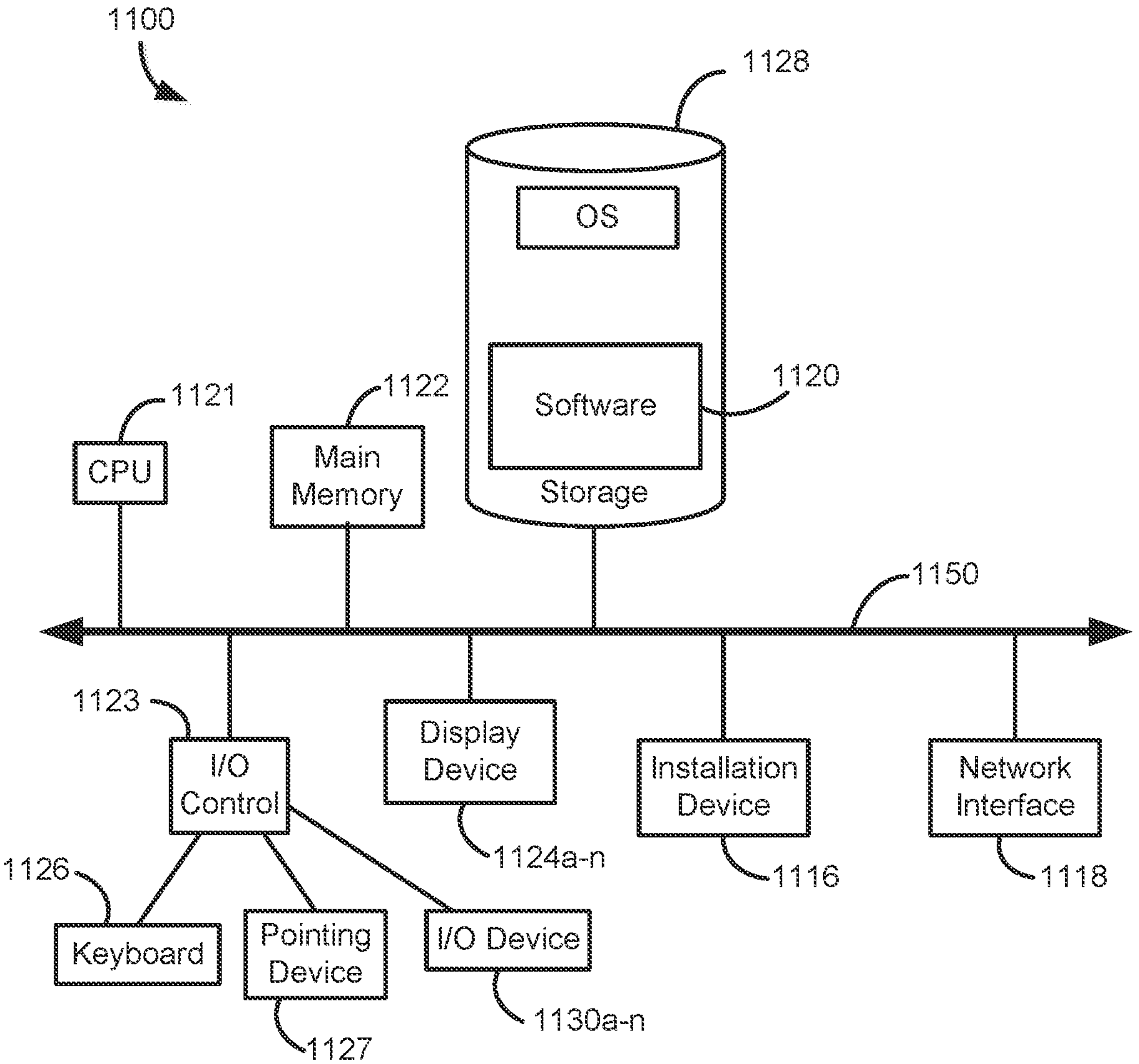
FIGS. 2B and 2C are block diagrams depicting embodiments of computing devices useful in connection with the methods and systems described herein.
Figure 2C:
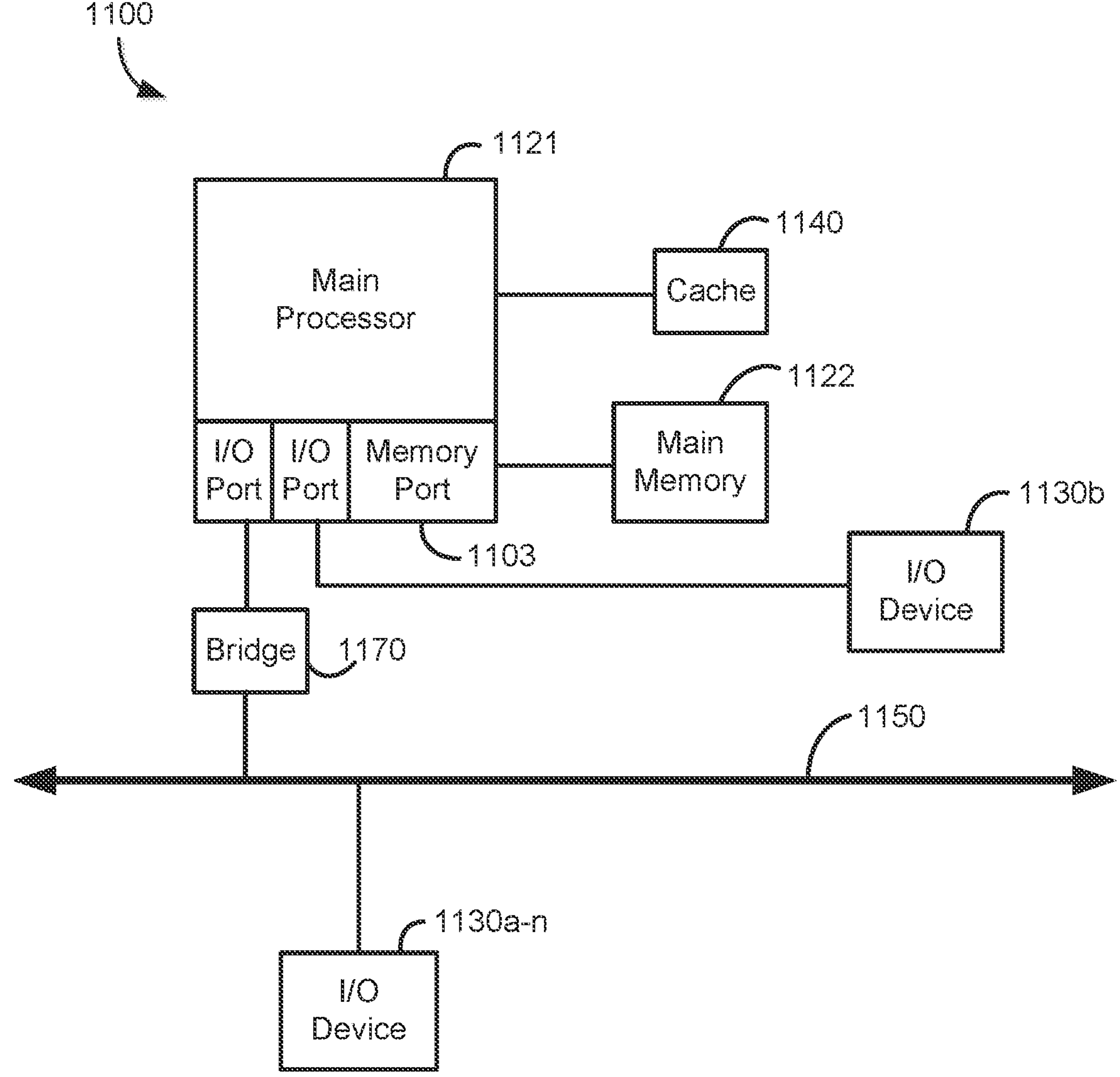

FIG. 2C depicts an embodiment in which the main processor 1221 communicates directly with cache memory 1240 via a secondary bus, sometimes referred to as a backside bus. In other embodiments, the main processor 1221 communicates with cache memory 1240 using the system bus 1250. Cache memory 1240 typically has a faster response time than main memory 1222 and is provided by, for example, SRAM, BSRAM, or EDRAM. In the embodiment shown in FIG. 12C, the processor 1221 communicates with various I/O devices 1230 via a local system bus 1250. Various buses may be used to connect the central processing unit 1221 to any of the I/O devices 1230, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 1224, the processor 1221 may use an Advanced Graphics Port (AGP) to communicate with the display 1224. FIG. 12C depicts an embodiment of a computer 1200 in which the main processor 1221 may communicate directly with I/O device 1230*b*, for example via HYPERTRANSPORT, RAPIDIO, or INFINIBAND communications technology. FIG. 2C also depicts an embodiment in which local busses and direct communication are mixed: the processor 1221 communicates with I/O device 1230*a* using a local interconnect bus while communicating with I/O device 1230*b* directly.

A wide variety of I/O devices 1230*a*-1230*n* may be present in the computing device 1200. Input devices include keyboards, mice, trackpads, trackballs, microphones, dials, touch pads, touch screen, and drawing tablets. Output devices include video displays, speakers, inkjet printers, laser printers, projectors, and dye-sublimation printers. The I/O devices may be controlled by an I/O controller 1223 as shown in FIG. 2B. The I/O controller may control one or more I/O devices such as a keyboard 1226 and a pointing device 1227, e.g., a mouse or optical pen. Furthermore, an I/O device may also provide storage and/or an installation medium 1216 for the computing device 1200. In still other embodiments, the computing device 1200 may provide USB connections (not shown) to receive handheld USB storage devices such as the USB Flash Drive line of devices manufactured by Twintech Industry, Inc. of Los Alamitos, California.

Referring again to FIG. 2B, the computing device 1200 may support any suitable installation device 1216, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 1200 may further include a storage device, such as one or more hard disk drives or redundant arrays of independent disks, for storing an operating system and other related software, and for storing application software programs such as any program or software 1220 for implementing (e.g., configured and/or designed for) the systems and methods described herein. Optionally, any of the installation devices 1216 could also be used as the storage device. Additionally, the operating system and the software can be run from a bootable medium.

Furthermore, the computing device 1200 may include a network interface 1218 to interface to the network 1204 through a variety of connections including, but not limited to, standard telephone lines, LAN or WAN links (e.g., 802.11, Ti, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 1200 communicates with other computing devices 1200' via any type and/or form of gateway or tunneling protocol such as Secure Socket Layer (SSL) or Transport Layer Security (TLS). The network interface 1218 may include a built-in network adapter, network interface card, PCMCIA network card, card bus network adapter, wireless network adapter, USB network adapter, modem or any other device suitable for interfacing the computing device 1200 to any type of network capable of communication and performing the operations described herein.

In some embodiments, the computing device 1200 may include or be connected to one or more display devices 1224*a*-1224*n*. As such, any of the I/O devices 1230*a*-1230*n* and/or the I/O controller 1223 may include any type and/or form of suitable hardware, software, or combination of hardware and software to support, enable or provide for the connection and use of the display device(s) 1224*a*-1224*n* by the computing device 1200. For example, the computing device 1200 may include any type and/or form of video adapter, video card, driver, and/or library to interface, communicate, connect or otherwise use the display device(s) 1224*a*-1224*n*. In one embodiment, a video adapter may include multiple connectors to interface to the display device (s) 1224*a*-1224*n*. In other embodiments, the computing device 1200 may include multiple video adapters, with each video adapter connected to the display device(s) 1224*a*-1224*n*. In some embodiments, any portion of the operating system of the computing device 1200 may be configured for using multiple displays 1224*a*-1224*n*. One ordinarily skilled in the art will recognize and appreciate the various ways and embodiments that a computing device 1200 may be configured to have one or more display devices 1224*a*-1224*n*.

In further embodiments, an I/O device 1230 may be a bridge between the system bus 1250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 1200 of the sort depicted in FIGS. 2B and 2C may operate under the control of an operating system, which control scheduling of tasks and access to system resources. The computing device 1200 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 1200 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 1200 has sufficient processor power and memory capacity to perform the operations described herein.

In some embodiments, the computing device 1200 may have different processors, operating systems, and input devices consistent with the device. For example, in one embodiment, the computing device 1200 is a smart phone, mobile device, tablet or personal digital assistant. In still other embodiments, the computing device 1200 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 1200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices, for example, consistent with the terms "user" and "multi-user" typically used in the context of a multi-user multiple-input and multiple-output (MU-MIMO) environment.

Although examples of communications systems described above may include devices and network devices operating according to DOCSIS 3.1 standard, it should be understood that embodiments of the systems and methods described can operate according to other standards. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. An amplifier for a cable network, the amplifier comprising:

circuitry configured to provide a parameter to at least one device on the cable network;

wherein the parameter is an echo cancelling signal to noise ratio measured using differences in echo canceller coefficients over a shorter time period and echo canceller coefficient drift measured by differences in the echo canceller coefficients over a longer time period.

2. The amplifier of claim 1, wherein the parameter is one or more of:

measurements of a frequency response, suckouts in a frequency domain, north upstream echo signal or power, north downstream signal or power, north upstream echo to downstream power ratio, north upstream echo to residual echo power ratio and/or, south downstream signal or power, upstream information, south downstream echo signal or power, south upstream signal or power, south downstream echo to upstream power ratio, south downstream echo to residual echo power ratio, and north upstream signal or power.

3. The amplifier of claim 1, further comprising:

one or more echo cancellers.

4. The amplifier of claim 3, wherein the one or more echo cancellers use the echo canceller coefficients in a frequency domain and in a time domain, wherein the echo canceller coefficients are used for detecting impairments in respective cable segments.

5. The amplifier of claim 4, wherein the parameter is communicated to a diagnostic server using a control channel provided using a cable of the cable network.

6. The amplifier of claim 1, wherein the parameter is sampled over time.

7. The amplifier of claim 1, wherein the parameter is two or more of:

measurements of a frequency response, suckouts in a frequency domain, north upstream echo signal or power, north downstream signal or power, north upstream echo to downstream power ratio, north upstream echo to residual echo power ratio, downstream echo canceller coefficients, south downstream signal or power, upstream information, south downstream echo signal or power, south upstream signal or power, south downstream echo to upstream power ratio, south downstream echo to residual echo power ratio, upstream echo canceller coefficients, and north upstream signal or power.

8. The amplifier of claim 1, wherein the parameter comprises all of:

measurements of a frequency response, suckouts in a frequency domain, north upstream echo signal or power, north downstream signal or power, north upstream echo to downstream power ratio, north upstream echo to residual echo power ratio, downstream echo canceller coefficients, south downstream signal or power, upstream information, south downstream echo signal or power, south upstream signal or power, south downstream echo to upstream power ratio, south downstream echo to residual echo power ratio, upstream echo canceller coefficients, and north upstream signal or power.

9. A circuitry, comprising:

a first port;

a second port; and a first circuit configured to:

amplify a first signal provided from the first port to the second port and a second signal provided from the second port to the first port;

provide echo cancellation; and provide a parameter to diagnose performance of a cable network;

wherein the parameter includes a signal to noise ratio that is measured based at least on one or more differences in one or more coefficients of a second circuit, the one or more coefficients configured to adjust at least one echo across the cable network, and the one or more differences determined over a first time period and a second time period that is larger than the first time period.

10. The circuitry of claim 9, wherein the parameter is one or more of:

measurements of a frequency response, suckouts in a frequency domain, north upstream echo signal or power, north downstream signal or power, north upstream echo to downstream power ratio, north upstream echo to residual echo power ratio, downstream echo canceller coefficients, south downstream signal or power, upstream information, south downstream echo signal or power, south upstream signal or power, south downstream echo to upstream power ratio, south downstream echo to residual echo power ratio, upstream echo canceller coefficients, and north upstream signal or power.

11. The circuitry of claim 9, wherein the first circuit is an integrated circuit.

12. The circuitry of claim 9, wherein the parameter is communicated to a diagnostic server using a control channel provided using the cable network.

13. The circuitry of claim 9, wherein the parameter is used for echo canceller data diagnostics for fault detection.

14. The circuitry of claim 9, wherein the parameter is two or more of:

measurements of a frequency response, suckouts in a frequency domain, north upstream echo signal or power, north downstream signal or power, north upstream echo to downstream power ratio, north upstream echo to residual echo power ratio, downstream echo canceller coefficients, south downstream signal or power, upstream information, south downstream echo signal or power, south upstream signal or power, south downstream echo to upstream power ratio, south downstream echo to residual echo power ratio, upstream echo canceller coefficients, and north upstream signal or power.

15. The circuitry of claim 9, wherein the parameter comprises all of:

measurements of a frequency response, suckouts in a frequency domain, north upstream echo signal or power, north downstream signal or power, north upstream echo to downstream power ratio, north upstream echo to residual echo power ratio, downstream echo canceller coefficients, south downstream signal or power, upstream information, south downstream echo signal or power, south upstream signal or power, south downstream echo to upstream power ratio, south downstream echo to residual echo power ratio, upstream echo canceller coefficients, and north upstream signal or power.

16. A method, comprising:

providing a first signal from a downstream port to an upstream port using a first circuit, the first circuit comprising the downstream port and the upstream port, the upstream port being configured to be coupled to a first communication medium, the downstream port being configured to be coupled to a second communication medium;

providing a second signal from the upstream port to the downstream port using the first circuit;

performing echo cancellation using the first circuit; and sampling a parameter at a location between the downstream port and the upstream port to diagnose performance of a cable network;

wherein the parameter includes a signal to noise ratio that is measured based at least on one or more differences in one or more coefficients of a second circuit, the one or more coefficients configured to adjust at least one echo across the cable network, and the one or more differences determined over a first time period and a second time period that is larger than the first time period.

17. The method of claim 16, wherein the parameter is one or more of:

measurements of a frequency response, suckouts in a frequency domain, north upstream echo signal or power, north downstream signal or power, north upstream echo to downstream power ratio, north upstream echo to residual echo power ratio, downstream echo canceller coefficients, south downstream signal or power, upstream information, south downstream echo signal or power, south upstream signal or power, south downstream echo to upstream power ratio, south downstream echo to residual echo power ratio, upstream echo canceller coefficients, and north upstream signal or power.

18. The method of claim 16, wherein the first circuit is an integrated circuit.

19. The method of claim 16, wherein the parameter is sampled over time.

* * * * *